US United States Patent Office
2,923,501
Patented Feb. 2, 1960

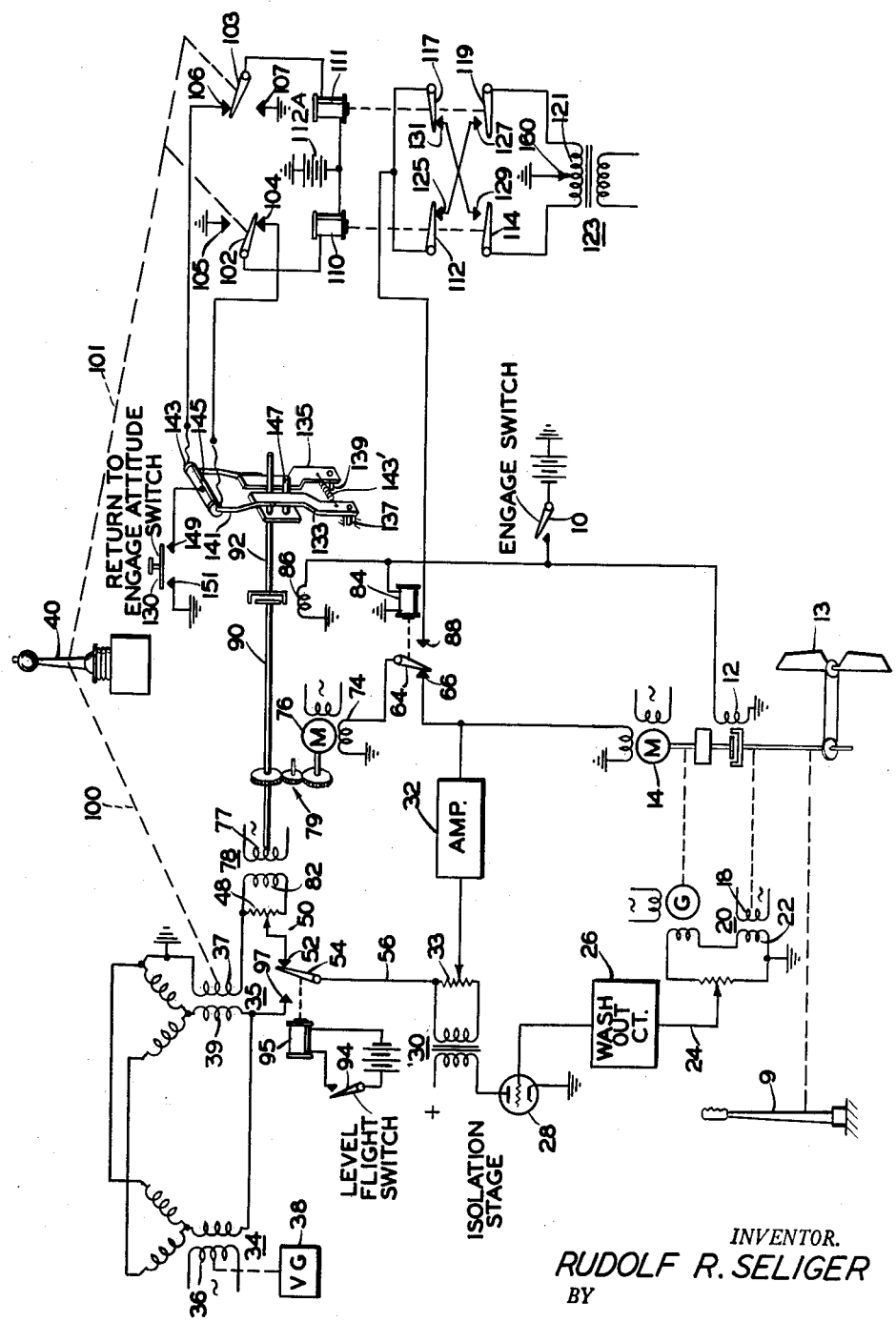

2,923,501

AIRCRAFT CONTROLLER ARRANGEMENT

Rudolf R. Seliger, Palisades Park, N.J., assignor to Bendix Aviation Corporation, Teterboro, N.J., a corporation of Delaware Application May 14, 1954, Serial No. 429,738

19 Claims. (Cl. 244—77)

This invention relates generally to control systems and more particularly to a controller for an automatic steering system for aircraft.

When an aircraft is equipped with an automatic pilot system, provision is usually made for engaging and disengaging the automatic pilot system from control of the craft so that the craft can be controlled by manipulating the conventional steering column and also so that the craft can be controlled through the automatic pilot system by manipulation of a manual controller.

While the manual controller for the automatic pilot system may take such diverse form as a knob, stick, wheel or pistol grip handle, the movement of the controller causes corresponding movement of the control surface. Thus the movement of the control surface depends upon the reflexes of the human pilot. Since the ease of displacement of the manual controller bears little or no relationship to the load imposed on the control surface, a possibility exists that the controller may be displaced to such an extent or so rapidly as to cause the resulting surface action to impose stresses on the craft far exceeding design limits.

A further problem presented is that displacement of the manual controller a given extent when the controller is at or near its normal central position results in a change of attitude that differs from the change developed by the same extent of displacement when the controller is substantially displaced from normal position. Thus, if the signal developing device connected with the controller is made to develop proper control signals per increment of controller displacement near the limit of displacement, the craft is undercontrolled for displacements near to the normal position of the controller; and, correspondingly, if the signal developing device is made to generate proper signals for small displacements from normal position, the craft is over-controlled for displacements near the maximum limits of controller displacement.

An object of the present invention, therefore, is to provide an automatic steering system with a novel displaceable controller system by which aircraft is controlled directly in accordance with the extent of displacement of the controller until a predetermined displacement limit has been exceeded and, thereafter, at a constant rate as long as the controller is displaced beyond these limits.

Another object is to provide a novel means for returning the craft to the attitude at which the automatic pilot system was engaged to control the craft.

A further object is to provide a novel arrangement for returning the craft to the attitude at which the automatic pilot system was engaged to control the craft, the rate of returning depending upon the direction of deviation of the craft from the engaged attitude and the return being continuous or intermittent as desired.

Still another object is to provide a servosystem with a novel controller which within predetermined limits develops a control signal directly proportional to the extent of operation of the controller and after the limit is exceeded develops a control signal which increases in magnitude at a constant rate so long as said controller remains at said predetermined limit, the latter control signal remaining at its last magnitude when the controller is returned to within the predetermined limit.

The present invention contemplates an automatic pilot system provided with a novel controller arrangement which causes a control surface to be moved an amount proportional to the displacement of the controller until a predetermined displacement has been reached, and upon continued displacement initiates the operation of an actuator which causes the surface to be moved so that the craft changes attitude at a constant rate; the effect of the actuator remaining even though the controller is returned to normal position, the arrangement including novel switching for selectively returning the craft to level attitude and to the attitude at which the automatic pilot system was engaged to control the craft. Adjustments may be made to cause the return to engage attitude to be accomplished at varying rates depending upon the direction of craft deviation.

The foregoing and other objects and advantages of the invention will appear more fully hereinafter from a consideration of the detailed description which follows, taken together with the accompanying drawing, wherein one embodiment of the invention is illustrated. It is to be expressly understood, however, that the drawing is for purposes of illustration and description, and is not to be construed as defining the limits of the invention.

In the single sheet of drawing, a schematic arrangement is shown of the novel controller arrangement of the present invention incorporated in an automatic pilot system of an aircraft.

The automatic pilot system is intended to be of conventional type. In order for the automatic pilot system to be disengaged to permit the craft to be maneuvered by the manipulation of a conventional steering column 9, an engage switch 10 in the embodiment illustrated herein is moved to an open circuit position, deenergizing the solenoid of a solenoid operated clutch 12 and freeing elevator surface 13 from control by motor 14. Elevator 13, then, may be moved by the manipulation of steering column 9 to place the craft in any desired attitude.

The movement of surface 13 displaces the rotor winding 18 of a conventional inductive device 20 to develop at stator 22 a signal corresponding in amplitude and in phase to the extent and direction of movement of surface 13 from a normal position. This follow-up signal is transmitted by way of lead 24 to a "washout" circuit which may be of the type described in U.S. Patent No. 2,432,036 or copending application No. 90,236, now U.S. Patent No. 2,754,418. The output from the "washout" circuit 26 is applied through a conventional isolation stage comprised of an amplifier 28 and a transformer 30 to the signal chain for amplifier 32. Thus, at potentiometer 33 the follow-up signal is combined with an attitude signal, the latter being derived from a conventional transmitter-receiver combination comprised of inductive devices 34 and 35 whose rotors 36 and 37 are connected with a vertical gyro 38 and a manual controller 40, respectively.

In a well-known manner, the relative displacement of rotors 36 and 37 of the transmitter-receiver combination develops at rotor 37 a signal corresponding in phase and amplitude to the direction and extent of the relative displacement. This signal is applied across a potentiometer 48 and by way of a lead 50, contact 52, armature 54 and a lead 56 is applied to potentiometer 33. Here, the attitude and the follow-up signals are combined and the signal summation is applied to amplifier 32.

When the automatic pilot system is not engaged with control surface 13, armature 64 engages a contact 66 connected to the output of amplifier 32. Thus, depending upon the phase of the signal summation, the output of amplifier 32 by way of armature 64 energizes the variable phase winding 74 of a conventional induction motor 76 to drive the motor in clockwise or counterclockwise direction. The motor 76 is drivably connected to the rotor 77 of an inductive device 78 through a gear train 79 and displacement of rotor winding 77 by the operation of motor 76 develops at stator winding 82 of inductive device 78 a signal in opposition to the signal sum appearing at the input to the amplifier. Thus, motor 76 tends to maintain the signal chain at null, i.e., the net signal input to amplifier 32 is zero, so the automatic pilot system may be smoothly engaged at any attitude of the craft.

To change from manual to automatic control, switch 10 is moved to a closed circuit position. This energizes solenoid operated clutch 12, relay 84, and magnetic clutch 86. Clutch 12 engages motor 14 for the operation of surface 13. Relay 84 disengages armature 64 from contact 66 and engages it with contact 88 so that motor 76 no longer operates to keep the signal input to amplifier 32 at null. Magnetic clutch 86 couples shaft 90 and 92 for a purpose hereinafter to be described. The automatic pilot system now stabilizes the craft in a predetermined attitude.

Displacement of the craft in pitch or displacement of rotor 37 by the manual controller 40 develops an attitude displacement signal corresponding in phase and amplitude to the direction and extent of displacement. After amplification and phase detection by amplifier 32, the signal actuates motor 14 to move elevator 13 until a follow-up signal is built up in inductive device 20 equal and opposite to the displacement signal. At this time, the net input signal to amplifier 32 is zero and motor 14 stops with the surface 13 displaced. As the surface displacement returns the craft to the desired attitude, the attitude displacement signal decreases and the follow-up signal prevails to operate servomotor 14 in an opposite direction to return elevator 13 to normal position.

When the craft has been placed in an abnormal attitude and it is desired to return the craft to straight and level flight, moving switch 94 to a closed circuit position energizes a solenoid 95 which disengages armature 54 from contact 52 and engages it with a contact 97. This renders the signal from the manual controller and synchronizing device ineffective so that the attitude signal resulting from vertical gyro 38 may return the craft to straight and level flight.

The system so far described is known in the art. In accordance with the present invention, a novel arrangement is provided for varying the attitude of the craft directly with the manual displacement of stick controller 40 for displacements within predetermined limits and for varying the attitude at a constant rate for displacements exceeding these predetermined limits. Also included is a novel arrangement for returning the craft to the attitude at which the servomotor of the automatic pilot system was engaged with a surface of the craft to control the craft.

Controller 40 is connected by a suitable mechanical linkage 100 with rotor winding 37 so that movement of stick 40 correspondingly displaces rotor winding 37 relative to its stator winding 39. Controller 40 is also connected by a suitable mechanical linkage 101 with a pair of switch arms 102 and 103. The mechanical linkage includes a lost motion arrangement so that when the stick is pushed forwardly a predetermined extent, arm 102 is disengaged from contact 104 and engaged with a grounded contact 105, and when stick 40 is pulled rearwardly a predetermined extent, arm 103 is disengaged from contact 106 and engaged with a grounded contact 107.

Switch arms 102 and 103 are each connected to one terminal of a pair of conventional solenoid relays 110 and 111 whose other terminals are connected to a common source of direct current 112A. Thus, the movement of switch arm 102 or 103 into engagement with grounded contact 105 or 107 completes a circuit through solenoid 110 or 111.

Solenoid 110, when energized, pulls armatures 112 and 114 upwardly from the position shown; and solenoid relay 111, when energized, pulls armatures 117 and 119 upwardly from the position shown. Armatures 112 and 117 are connected to contact 88, and armatures 114 and 119 are connected to the opposite end terminals of a secondary winding 121 of an energized transformer 123. Normally, armature 112 engages a contact 125 connected with contact 127, and armature 114 engages a contact 129 connected with a contact 131.

Considering now the operation of the novel controller arrangement, as stick 40 is moved within predetermined limits, rotor 37 is displaced by linkage 100 to develop a corresponding signal. As the stick is moved beyond the predetermined limit, for example, if it is pulled rearwardly, arm 103 by way of linkage 101 is disengaged from contact 106 and engaged with contact 107. This completes a circuit from energizing source 112A through solenoid relay 111 to ground, energizing the relay. This lifts armatures 117 and 119. The engaging of armature 119 and contact 127 permits motor 76 to be energized from transformer 123 by way of armature 119, contact 127, contact 125, armature 112, contact 88, and armature 64. As long as controller 40 is in this position, motor 76 operates to displace rotor 77 at a constant rate, thereby developing a signal of constantly increasing amplitude for amplifier 32. The signal then is an integral of the time controller 40 is maintained beyond the predetermined limits. Obviously, the reverse occurs if stick 40 is moved forwardly. Solenoid 110 is energized after a predetermined movement, and motor 76 is now operated in the opposite direction by energy supplied from transformer 123 by way of armature 114, contact 129, contact 131, armature 117, contact 88 and armature 64.

It will be apparent that for displacements of controller 40 within predetermined limits, the signal supplied to the servomotor is developed by rotor winding 37 and varies in amplitude directly with the extent of the movement of the stick. For displacements of controller 40 exceeding this limit, the signal is developed by displacement of rotor winding 77 and varies in amplitude with the length of time that the stick is held beyond the predetermined limit, i.e., the signal is proportional to an integral of the time the displacement of controller 40 exceeds the predetermined limits.

When controller 40 is returned to the predetermined limit or to normal position, whichever arm 102 or 103 has been displaced, returned to the normal position shown and motor 76 is deenergized. Rotor winding 76, however, remains in its last position, thus developing a steady control signal which causes the craft to be placed in an attitude where the signal developed by vertical gyro 38 due to the displacement of the craft from a predetermined pitch attitude is equal and opposite to the steady signal.

To return the craft to level flight, switch 94 may be moved to a closed circuit position, energizing relay 95 and disengaging armature 54 and contact 52 so as to render ineffective the signals developed by rotors 37 or 77. The stick may also be moved beyond the predetermined limits in the opposite direction to drive rotor 77 in the opposite direction.

It may be that the position at which the automatic pilot system is energized is not a level flight position. To return the craft to this position, a "return to engage position" button switch 130 is provided, and a memory arrangement to recognize the energized attitude.

As switch arm 10 is moved to a closed circuit position to engage the automatic pilot system to control surface 13, magnetic clutch 86 is engaged so that any subsequent Operation of motor 76 displaces shaft 92. Straddling shaft 92 are a pair of levers 133 and 135 pivoted at 137 and 139 having contacts 141 and 143 thereon but insulated therefrom. These levers are urged together by a spring 143' so as to engage a fixed abutment, herein shaft 92 and common contact 145. A projection 147 on a bracket fixed to shaft 92 engages with both levers 133, 135 when the shaft is in a normally centered position. When the shaft rotates in either direction, cam arm projection 147 moves the contact on one lever away from member 145 while the contact on the other arm remains in engagement with member 145. Member 145 is connected to a contact 149 and a contact 151 is grounded, these contacts being bridged when button 130 is depressed.

Should button 130 be depressed when both contacts 141 and 143 engage member 145, both relays 110 and 111 would be energized. Since both armatures 112 and 117 are pulled upwardly, the connection from transformer 123 to motor 76 is opened and no energy is received by the motor. However, should one contact be disengaged from common member 145 and button 130 be depressed, only one solenoid 110, 111 is engaged so the armatures on only one set of relays are pulled upwardly to cause the motor to be driven to centered position. As both arms engage member 45, both solenoids 110 and 111 are again energized, and the disengagement of armatures 112 and 117 from contacts 125 and 131 deenergizes motor 76.

Inasmuch as it may be desirable to return the craft to the engaged position at a different rate when a dive attitude is required than when a climb attitude is required, tap 160 is made adjustable to vary the rate at which motor 76 operates from the left and right sides of transformer 123.

If desired, the pilot may move controller 40 to place the craft in a climb or dive attitude. Then by depressing button 130 for short periods of time, return the craft to an engage position by increments.

The foregoing has presented an automatic steering system in which is incorporated a novel means for controlling the craft directly by manual actuation of a controller within predetermined limits and thereafter controlling the craft at a constant rate. The craft may be returned to level flight or to an engaged position by actuation of the controller in an opposite direction. By engaging a switch, the novel controller arrangement may be rendered ineffective and the craft returned to level flight. Also, by depressing a "return to engage position" button, the craft may be returned to the position at which the automatic pilot was engaged for operation of the craft. This latter operation may be continuous or intermittent, as desired.

Although but one embodiment of the invention has been illustrated and described in detail, it is to be expressly understood that the invention is not limited thereto. Various changes can be made in the design and arrangement of the parts without departing from the spirit and scope of the invention, as the same will now be understood by those skilled in the art.

I claim:

1. A steering system for a craft comprising power means for changing the attitude of said craft, a member displaceable from a normal position, first means actuated by displacement of said member within a predetermined limit for developing a control effect for said power means corresponding in sense and magnitude to said displacement, second means actuated by displacement of said member exceeding said predetermined limit for developing a control effect whose magnitude increases at a constant rate corresponding to the time duration of said displacement beyond said predetermined limit, and means for operating said power means by said control effects.

2. A steering system for a craft comprising power means for actuation of a surface of said craft, a manual control member displaceable from a normal position, first means actuated by displacement of said member within predetermined limits for developing a control signal for said power means corresponding in phase and amplitude to said displacement, second means actuated by a displacement of said member exceeding said predetermined limit for developing a control signal whose amplitude increases at a constant rate corresponding to the time duration of said latter displacement and means for operating said power means by said control signals.

3. A steering system for a craft comprising power means for actuation of a surface of said craft, a manually operable member displaceable in reverse directions from a normal position, first signal means actuated directly by displacement of said member within predetermined limits for developing a control signal for said power means corresponding in sense and amplitude to the direction and extent of said displacement from a normal position, a second signal means, motor means rendered operable by displacement of said member exceeding said predetermined limits for actuating said second signal means to develop a control signal whose amplitude is proportional to an integral of the time of said displacement exceeding said limits, and whose phase is determined by the direction of said displacement, and means for operating said power means by said control signals.

4. A steering system for a craft comprising power means for actuation of a surface of said craft, a member displaceable in reverse directions from a normal position, first signal means actuated by displacement of said member within predetermined limits for developing a first control signal for said power means corresponding in sense and amplitude to the direction and extent of said displacement from a normal position, second signal means, means rendered operable by displacement of said member exceeding said predetermined limits for actuating said second signal means to develop a second control signal whose amplitude is proportional to an integral of the time of said displacement exceeding said limits, means for providing a signal of greater amplitude for displacement of the member beyond said limits in one direction than in the other direction, and means for operating said power means by said control signals.

5. A steering system for a craft comprising power means for actuation of a surface of said craft, a member displaceable in reverse directions from a normal position, means actuated by displacement of said member within predetermined limits for developing a first control signal for said power means corresponding in sense and amplitude to the direction and extent of said displacement from a normal position, means actuated by displacement of said member exceeding said predetermined limits for developing a second control signal whose amplitude is proportional to an integral of the time that said displacement exceeds said limits, said second signal remaining at its last value when said controller is returned to said predetermined limit, and means for operating said power means by said control signals.

6. A steering system for a craft having a movable control surface, comprising a member displaceable from a normal position, means actuated by displacement of said member within a predetermined limit for developing a first control signal corresponding in sense and magnitude to the sense and extent of said displacement, means actuated by a displacement of said member exceeding said predetermined limit for developing a second control signal whose amplitude increases at a constant rate during said displacement exceeding said predetermined limit, power means, means for operating said power means by said control signals, means for rendering said power means effective and ineffective for moving said control surface, and means for returning said power means to its position at the time said power means was rendered effective to control the surface.

7. In a system for controlling the attitude of a craft, an automatic control system, a manual control system, means for rendering said automatic control system effective for controlling said craft automatically and for rendering said automatic control system ineffective, means for preconditioning said automatic control system during operation of the craft by said manual control system to render the automatic control system effective to control said craft automatically at any attitude, means operable within predetermined limits for changing the attitude at which said automatic control system stabilizes the craft, and means rendered effective upon operation of said last-named means beyond said predetermined limits for actuating said preconditioning means to change the attitude at which said system stabilizes the craft.

8. A system comprised of a motor, a shaft adapted to be driven by said motor, a pair of levers straddling said shaft and each carrying an element, a common member adapted to be engaged by each of said elements, means for rendering said motor effective and ineffective to drive said shaft, means operably connected with said shaft for displacing one of said elements from said common member when said shaft is driven in a clockwise or counterclockwise direction, and means operable through the engagement of the other of said elements and said common member for operating said motor to return said shaft to the position from which it was driven, said motor being effective to drive said shaft when said last-mentioned means is operable.

9. An automatic steering system for a craft having a movable surface, comprising power means for moving said surface, first signal developing means operable to develop a signal for operating said power means, manually displaceable means for actuating said signal developing means, second signal developing means operable to develop a second signal for said power means, a motor for operating said second signal developing means, an energy source for said motor, and means rendered operable after a predetermined displacement of said manually displaceable means for connecting said energy source and said motor for the operation of said motor to develop said second signal.

10. An automatic steering system for a craft having a movable surface, power means for moving said surface, first and second signal developing means which when actuated develop control signals of a sense dependent upon the direction of actuation for operating said power means, a manual displaceable member, means for directly actuating said first signal developing means by said manually displaceable member, means for indirectly actuating said second signal developing means by said manually displaceable member including a motor for actuating said second signal developing means, an energy source, connection means operable for connecting said source with said motor for operating the latter, said connection means being reversible whereby said motor may be reversibly operated, means rendered operable after a predetermined displacement of said manually displaceable means for actuating said connecting means to operate said motor from said energy source whereby said second signal generator is actuated to develop a signal of the same sense as the signal from said first signal developing means, and means for operating said power means from said signals.

11. An automatic steering system for a craft having a movable surface, power means for moving said surface, first and second signal developing means for developing signals of a sense dependent upon the direction of actuation, means for operating said power means from said signals, manual displaceable means for actuating said first signal developing means, a motor, an energy source, means for connecting said source with said motor for operating the latter, said connection means being reversible whereby said motor may be reversibly operated, means operable after a predetermined displacement of said manually displaceable means for actuating said connecting means to operate said motor from said energy source, means connecting said motor and second signal developing means for actuation of said second signal developing means to develop a signal of the same sense as the signal from said first signal developing means, and means operable for connecting said motor and said source so as to return said motor to the position at which said motor and signal developing means were connected.

12. A steering system for a craft comprising power means, means for engaging said power means for actuating a surface of said craft and for disengaging said power means from said surface, attitude responsive means for developing a first control effect corresponding in sense and magnitude to the direction and extent of displacement of the craft from a predetermined attitude, means for connecting said attitude responsive means and said power means including signal means for bringing the net control effect to said power means to zero when said power means is disengaged from said surface, a member movable from a normal position, means actuated by movement of said member within predetermined limits for developing a second control effect for said power means corresponding in sense and magnitude to said movement, means actuated by movement of said member exceeding said predetermined limit for operating said signal means for developing a third control effect whose sense is the same as said second control effect and whose magnitude increases at a constant rate corresponding to the time during which said movement exceeds said limits, and means for operating said power means by said control effects.

13. A steering system for a craft having a surface for controlling the attitude of the craft, comprising power means, means for engaging said power means for actuating said surface and for disengaging said power means from said surface, attitude responsive means for developing a first control signal corresponding to the displacement of the craft from a predetermined attitude, means for connecting said attitude responsive means and said power means including signal means for developing a signal for reducing the net control signal for said power means to zero when said power means is disengaged from said surface, a member movable from a normal position, means actuated by movement of said member within predetermined limits for developing a second control signal for said power means corresponding in sense and magnitude to the direction and extent of said movement, means actuated by movement exceeding said predetermined limit for operating said signal means for developing a third control signal whose sense is the same as said second control signal and whose magnitude increases at a constant rate corresponding to the length of time said movement exceeds said limits, and means for operating said power means by said control effects, said third signal remaining in said system after said member is returned to said predetermined limits to place said craft in an attitude in which said first signal balances said third signal.

14. A steering system for a craft having a surface for controlling the attitude of the craft, comprising power means, means for engaging said power means for actuating said surface and for disengaging said power means from said surface, attitude responsive means for developing a first control signal corresponding to the displacement of the craft from a predetermined attitude, means for connecting said attitude responsive means and said power means including signal means for developing a signal for rendering the net control signal to said power means zero when said power means is disengaged from said surface, a member manually movable from a normal position, means actuated by movement of said member within predetermined limits for developing a second control signal for said power means corresponding in sense and magnitude to said movement, means actuated by movement exceeding said predetermined limit for operating said signal means for developing a third control signal whose sense is the same as said second control signal and whose magnitude increases at a constant rate corresponding to the length of time said movement exceeds said limits, and means for operating said power means by said control effects, said third signal remaining in said system after said member is returned to said predetermined limits to place said craft in an attitude in which said first signal balances said third signal, and means operable for operating said signal means to return said craft to the attitude at which said power means was engaged with said surface.

15. In a craft having power means for controlling the attitude of the craft, means for rendering said power means effective and ineffective for control of said attitude, attitude reference means, a first signal means actuated by said reference means for developing a control signal corresponding to the displacement of the craft from a predetermined attitude, a signal chain connecting said first signal developing device and said power means including a second signal developing device, a motor for actuating said second signal developing device, first switch means for operating said motor for actuating said second signal developing device for rendering the net control signal to said power means zero when said power means is rendered ineffective, a member manually movable from a normal position, a third signal developing device actuated by displacement of said member for developing a third control signal for said power means corresponding to the movement of said member, second switch means actuated by movement of said member exceeding a predetermined limit for operating said motor for actuating said second signal developing device to develop a control signal whose amplitude increases at a constant rate as long as said movement exceeds said limit, and means for operating said power means by said control signals.

16. A steering system for a craft comprising power means for changing the attitude of said craft, a controller manually displaceable from a centered position, and means connected with said manual controller and said power means for operating said power means to change the attitude of the craft in proportion to the displacement of said controller until said displacement exceeds a predetermined limit and means connected with said manual controller and said power means for operating said power means to change the attitude of the craft at a constant rate after said controller has been displaced beyond the predetermined limit.

17. A control system for a craft comprising power means, control means for operating said power means including a plurality of signal devices, a motor for actuating one of said devices, a manually displaceable controller for actuating another of said devices, and selective means having first and second manners of operation, said first manner of operation rendering said motor capable of operation by said control means to maintain the net value of said signal devices at zero and said power means incapable of controlling said craft, said second manner of operation rendering said motor incapable of operation by said control means but capable of operation by said controller after a predetermined displacement of said controller and said power means capable of controlling said craft.

18. A control system for a craft comprising power means, control means for operating said power means including a plurality of signal devices, a motor for actuating one of said devices, a manually displaceable controller for actuating another of said devices, attitude reference means for actuating another of said devices, selective means having first and second manners of operation, said first manner of operation rendering said motor capable of operation by said control means to maintain the net value of said signal devices at zero and said power means incapable of controlling said craft, said second manner of operation rendering said motor incapable of operation by said control means but capable of operation by said controller after a predetermined displacement of said controller and rendering said power means capable of controlling said craft, and means for rendering said motor actuated signal device and said controller actuated signal device ineffective to operate said power means to return said craft to level flight.

19. A control system for a craft comprising power means for operating a craft control surface to control the attitude of the craft, manually operable means for operating the control surface to change the attitude of the craft, means for rendering the power means ineffective to operate the control surface for controlling the craft and for rendering the power means effective to operate the control surface to maintain the craft in the attitude assumed by the craft when the power means was rendered effective, means for controlling the power means to return the craft to a level flight attitude, and means for controlling the power means to operate the control surface to return the craft to the attitude assumed by the craft when the power means was rendered effective.

References Cited in the file of this patent

UNITED STATES PATENTS

| | | |
|---|---|---|
| 2,415,429 | Kellogg, et al. | Feb. 11, 1947 |
| 2,512,902 | Rossire | June 27, 1950 |
| 2,633,313 | Kutzler | Mar. 31, 1953 |
| 2,670,911 | Harcum | Mar. 2, 1954 |